United States Patent
Chuang (10) Patent No.: US 6,883,687 B2
(45) Date of Patent: Apr. 26, 2005

(54) CONTINUOUSLY SHOOTING PNEUMATIC GREASE GUN STRUCTURE

(76) Inventor: Chia-Chiung Chuang, 3F, No. 22, Lane 337, Sung-Jeou Rd., Taichung City (TW)

( * ) Notice: Subject to any disclaimer, the term of this patent is extended or adjusted under 35 U.S.C. 154(b) by 66 days.

(21) Appl. No.: 10/301,754

(22) Filed: Nov. 22, 2002

(65) Prior Publication Data

US 2003/0222106 A1 Dec. 4, 2003

Related U.S. Application Data

(63) Continuation-in-part of application No. 10/158,917, filed on Jun. 3, 2002, now abandoned.

(51) Int. Cl.$^7$ ................................................ G01F 11/00
(52) U.S. Cl. ........................ 222/389; 222/261; 222/334; 184/105.2
(58) Field of Search ................................ 222/256, 389, 222/334, 257–263, 394, 325, 327; 184/29, 42, 55.1, 105.1, 105.2; 251/282, 63.6

(56) References Cited

U.S. PATENT DOCUMENTS

| | | | | |
|---|---|---|---|---|
| 2,175,522 A | * | 10/1939 | Ginter | 222/262 |
| 2,259,857 A | * | 10/1941 | Ostendorf | 417/401 |
| 2,505,839 A | * | 5/1950 | Scovell | 222/262 |
| 5,779,105 A | * | 7/1998 | Brown et al. | 222/262 |
| 6,290,106 B1 | * | 9/2001 | Kuo | 222/389 |
| 6,494,347 B1 | * | 12/2002 | Yeh | 222/262 |
| 6,585,135 B1 | * | 7/2003 | Yeh | 222/256 |
| 6,736,292 B1 | * | 5/2004 | Grach et al. | 222/262 |
| 2003/0222104 A1 | * | 12/2003 | Chuang | 222/256 |

* cited by examiner

Primary Examiner—Frederick Nicolas
(74) Attorney, Agent, or Firm—Troxell Law Office, PLLC (57) ABSTRACT

Continuously shooting pneumatic grease gun structure including an air chamber housing defining an elongated air chamber. A push hole extends from the air chamber through one end of the housing to an outer side. A piston is reciprocally axially movably disposed in the air chamber between a start position and an end position. A grease push rod is coaxially fitted in the push hole and synchronously movable along with the piston. A restoring spring is compressed between the end of the housing and the piston to resiliently keep the piston in the start position. A controlling valve is movably disposed on the housing between an open position and a close position. A shift air passage is formed in the body section controlling the air in the air chamber and moving the controlling valve from an open position to a closed position.

5 Claims, 7 Drawing Sheets

CONTINUOUSLY SHOOTING PNEUMATIC GREASE GUN STRUCTURE

This is a continuation-in-part of application Ser. No. 10/158,917, filed Jun. 3, 2002, now abandoned the title of which is incorporated herein by reference.

BACKGROUND OF THE INVENTION

The present invention is related to a pneumatic tool, and more particularly to an improved continuously shooting pneumatic grease gun structure.

U.S. Pat. No. 5,779,105 discloses a continuously shooting pneumatic grease gun. The piston in the air chamber for driving grease push rod is formed with several escape holes. A corresponding valve rod is fitted in each escape hole for blocking the same. A spring exerts resilient force onto the valve rod, whereby when the valve rod is not under external force, the escape hole is kept free. Accordingly, when external high pressure air gets into the air chamber to drive the piston, the valve rod suffers the pressure to axially move to a position where the valve rod blocks a corresponding escape hole. At this time, the piston forwards and drives the grease push rod to push the grease out of the grease gun. When the forwarding operation of the piston is completed, the valve rods suffer a reaction force and are pushed away to unblock the escape holes. At this time, the high pressure air in the air chamber escapes out through the escape holes. Then the piston is restored to its home position by the spring for next reciprocation and successive shot.

According to the above structure, when the high pressure air in the air chamber escapes, the external high pressure air source still continuously fill high pressure into the air chamber. The successively filled in high pressure air immediately escapes through the escape holes without affecting the backward travel of the piston and hindering the piston from restoring to its home position. However, the resource of the high pressure air is wasted.

SUMMARY OF THE INVENTION

It is therefore a primary object of the present invention to provide an improved continuously shooting pneumatic grease gun structure. In the backward travel of the piston, the passage for the external high pressure air to enter the air chamber is blocked so as to save energy. Therefore, the high pressure air is effectively utilized to avoid waste of resource.

It is a further object of the present invention to provide the above improved continuously shooting pneumatic grease gun structure in which the pressure of the high pressure air source will not quickly decrease and the high pressure air is stably provided for the grease pushing operation. Accordingly, the pneumatic grease gun is used under stable pressure and thus the grease dispensing speed and amount are both stabilized.

According to the above objects, the continuously shooting pneumatic grease gun structure of the present invention includes an air chamber housing defining therein an elongated air chamber. A push hole extends from the air chamber through one end of the housing to an outer side thereof. A piston is reciprocally axially movably disposed in the air chamber between a start position and an end position. When in the end position, the piston permits the air in the air chamber to pass through the piston and escape from an outlet passage of the housing. A grease push rod is coaxially fitted in the push hole and synchronously movable along with the piston. A restoring spring is compressed between the end of the housing and the piston to resiliently keep the piston in the start position. A controlling valve is movably disposed on the housing between an open position and a closed position. When in the closed position, the controlling valve blocks an inlet passage of the housing to hinder external high pressure air from entering the air chamber, while when in the open position, the controlling valve unblocks the inlet passage, permitting external high pressure air to enter the air chamber. A shift air passage is formed in the body section for such conducting the air in the air chamber as to move the controlling valve from the open position to the closed the position.

The present invention can be best understood through the following description and accompanying drawings wherein:

DETAILED DESCRIPTION OF THE PREFERRED EMBODIMENTS

The continuously shooting pneumatic grease gun structure 10 of the present invention includes an air chamber housing 20, a piston 30, a grease push rod 40, a restoring spring 50, a controlling valve and a shift air passage 70.

The air chamber housing 20 includes a cylindrical body section 21 defining therein an elongated air chamber 22. The air chamber 22 axially extends in the body section 21. A cavity 23 rightward extends from the right wall of the air chamber 22. The cavity 23 is divided into a small inner diameter section 231 and a large inner diameter section 232. An inlet passage 24 extends from the small inner diameter section 231 of the cavity 23 to the bottom of the body section 21. External high pressure air passes through the opening 241 of the inlet passage 24 at the small inner diameter section 231 and passes through the cavity 23 into the air chamber 22. An outlet passage 25 passes through the left end of the body section 21 to communicate the left end of the air chamber 22 with the outer side of the body section 21, whereby the air in the air chamber 22 can be exhausted through the outlet passage. A push hole 26 axially extends through the wall of left end of the body section 21. A leakproof washer 27 with V-shaped annular groove is coaxially inlaid in an opening of the push hole 26 communicating with the air chamber 22. On one hand, the leakproof washer 27 serves to prevent the grease from infiltrating through the push hole 26 into the air chamber 22. On the other hand, the leakproof washer 27 serves to provide a buffing effect.

The piston 30 is a cylindrical body axially slidably disposed in the air chamber 22. The piston 30 is reciprocally axially movable within the air chamber 22 between a start position and an end position. When in the start position, the piston 30 abuts against the wall of the right end of the air chamber 22. The piston 30 has a circular piston body 31 coaxially accommodated in the air chamber 22. The circumference of the piston body 31 is airtight engaged with the wall of the air chamber 22. An internal space 32 is formed in the piston body 31. A through hole 33 inward extends from the right end face of the piston body 31 to communicate with the internal space 32. An annular groove 34 is formed on the circumference of the piston body 31, whereby a gap is defined between the piston body 31 and the wall of the air chamber 22. A vent 35 communicates with the annular groove 34 and the internal space 32. Three escape tunnels 36 inward extend from left end of the piston body 31 to communicate with the internal space 32. A sealing rod 37 is coaxially fitted in the through hole 33. Left end of the sealing rod 37 is positioned in the internal space 32, while right end of the sealing rod 37 extends out of the right end face of the piston body 31. The sealing rod 37 is axially movable between an escape position and a sealing position. When in the sealing position, the left end of the sealing rod 37 blocks and seals the opening of the vent 35. An airtight ring 38 is fitted on right end of the sealing rod 37. When the sealing rod 37 is positioned in the sealing position, the airtight ring 38 abuts against the right side of the circumference of the through hole 33 so as to isolate the airflow.

The grease push rod 40 is synchronously movable along with the piston 30. The grease push rod 40 has a rod body 41 with a certain length and diameter. The right end of the rod body 41 has a disc 42 inserted in a central portion of left side of the piston body 31. The left end of the rod body 41 extends into the push hole 26.

The restoring spring 50 is received in the air chamber 22. Two ends of the restoring spring 50 respectively abut against the left wall of the air chamber 22 and the left face of the disc 42 of the grease push rod 40. The restoring spring 50 provides resilient force to keep the piston 30 in the start position.

The controlling valve 60 is cylindrical and coaxially received in the cavity 23. The controlling valve 60 is reciprocally axially movable between an open position and a closed position. The controlling valve 60 has a cylindrical body 61 with a certain outer diameter. The cylindrical body 61 is correspondingly received in the small inner diameter section 231. A larger cylindrical end block 62 is coaxially connected with right end of the cylindrical body 61 and movably received in the large inner diameter section 232. A blind hole 63 leftward extends from right end of the end block 62 to the cylindrical body 61 for reducing the weight of the end block 62. Three notches 64 are formed on right end of the end block 62. An annular groove 65 is formed on the circumference of the cylindrical body 61. A sealing washer 66 is fitted in the annular groove 65. When the controlling valve 60 is positioned in the closed position, the cylindrical body 61 axially moves to make the sealing washer 66 block the opening 241 of the inlet passage 24 so as to prevent the external air from flowing through the cavity 23 into the air chamber 22. When the controlling valve 60 is positioned in the open position, the cylindrical body 61 is moved to a certain position on one side of the opening 241, permitting the opening 241 to communicate with the cavity 23, whereby the external air can go through the cavity 23 into the air chamber 22.

The shift air passage 70 is an internal close flow way formed in the body section 21 for air to pass therethrough. Two openings 71, 72 of two ends of the shift air passage 70 are respectively formed on the large inner diameter section 232 of the cavity 23 and a portion of the wall of the air chamber 22 corresponding to the end position of the piston 30. When the piston 30 is moved to the end position, the shift air passage 70 communicates with the large inner diameter section 232 and the air chamber 22, whereby the high pressure air can go through the shift air passage into the large inner diameter section 232. Also, when the piston 30 is moved to the end position, the opening 71 of the shift air passage 70 on the wall of the air chamber 22 synchronously communicates with the annular groove 34 and the portion of the air chamber 22 containing high pressure air, whereby the high pressure air can at the same time go into the annular groove 34. Via the vent 35, the high pressure air forcedly pushes the sealing rod 37 to axially move from the sealing position to the escape position.

Figure 3:
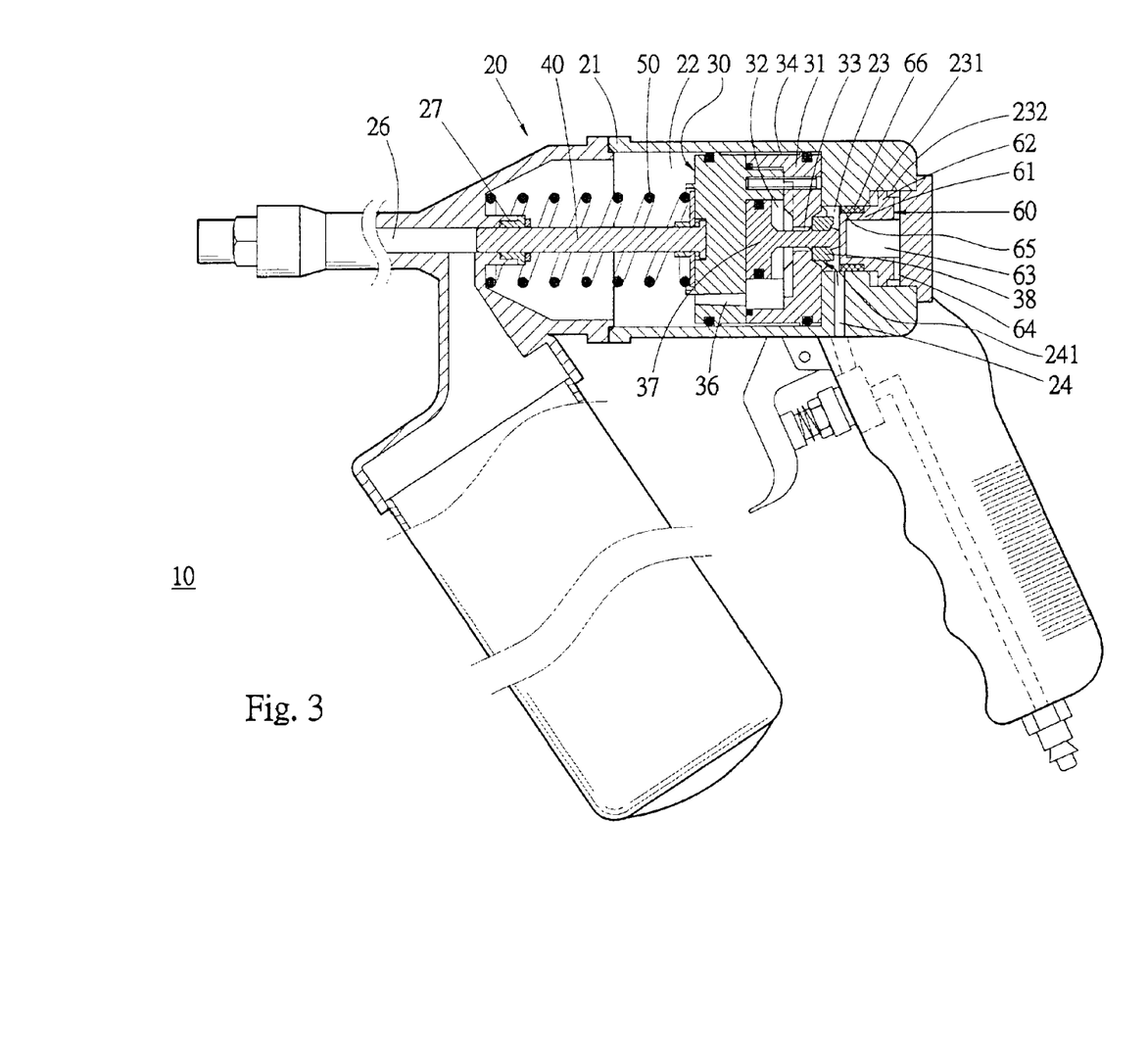
FIG. 3 is a sectional view taken along line 3—3 of FIG. 1, in which the piston is positioned in the start position.
Figure 4:
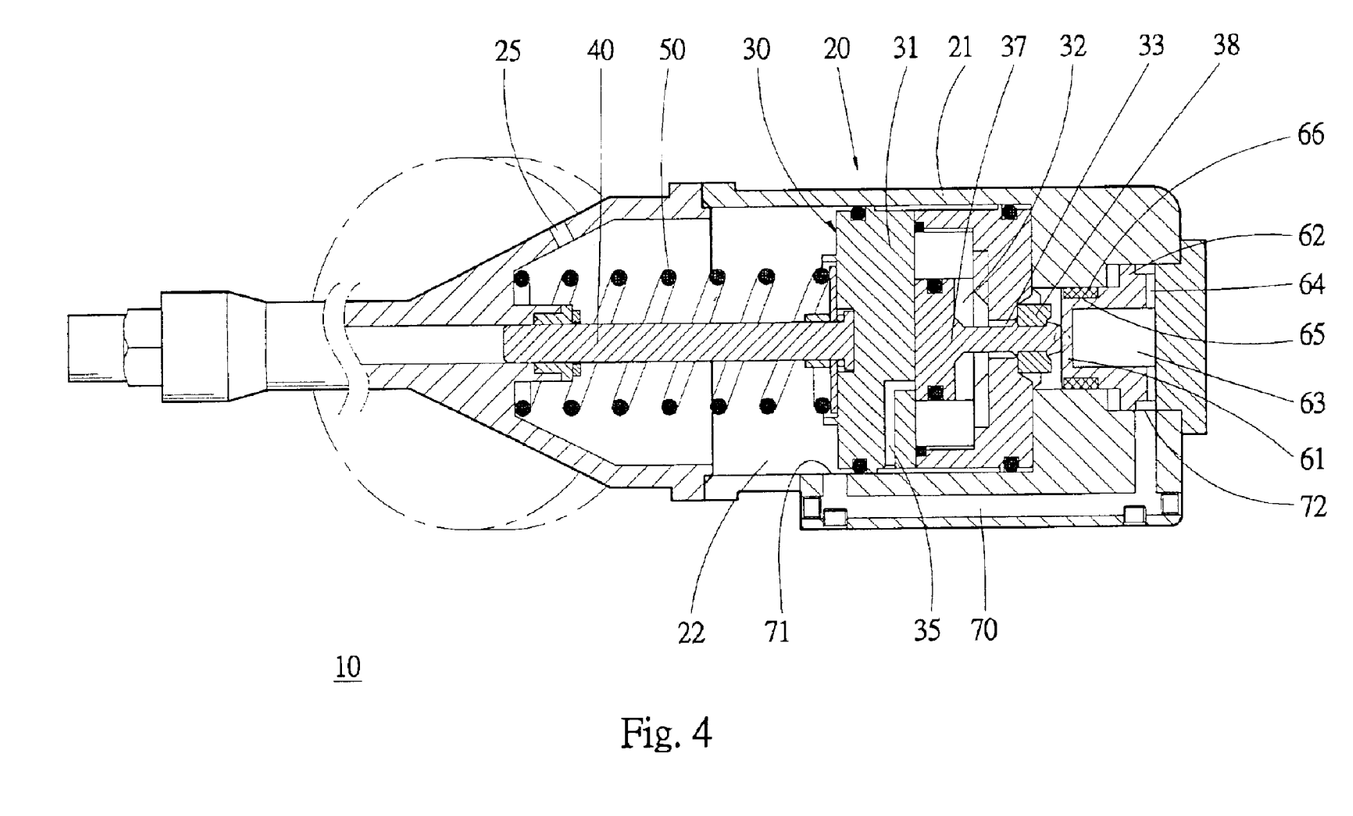
FIG. 4 is a sectional view taken along line 4—4 of FIG. 1.

By means of the above arrangement, the present invention is able to smoothly, stably and continuously dispense the grease for use. Referring to FIGS. 3 and 4, before the external high pressure air gets in, the restoring spring 50 resiliently synchronously pushes the grease push rod 40 and the piston body 31 leftward to abut against the left wall of the air chamber 22 and the piston body 31 is positioned in the start position. The piston body 31 tightly abuts against the wall of the air chamber 22, whereby the sealing rod 37 and the controlling valve 60 are synchronously pushed and respectively positioned in the sealing position and open position before the grease is pushed out.

Figure 5:
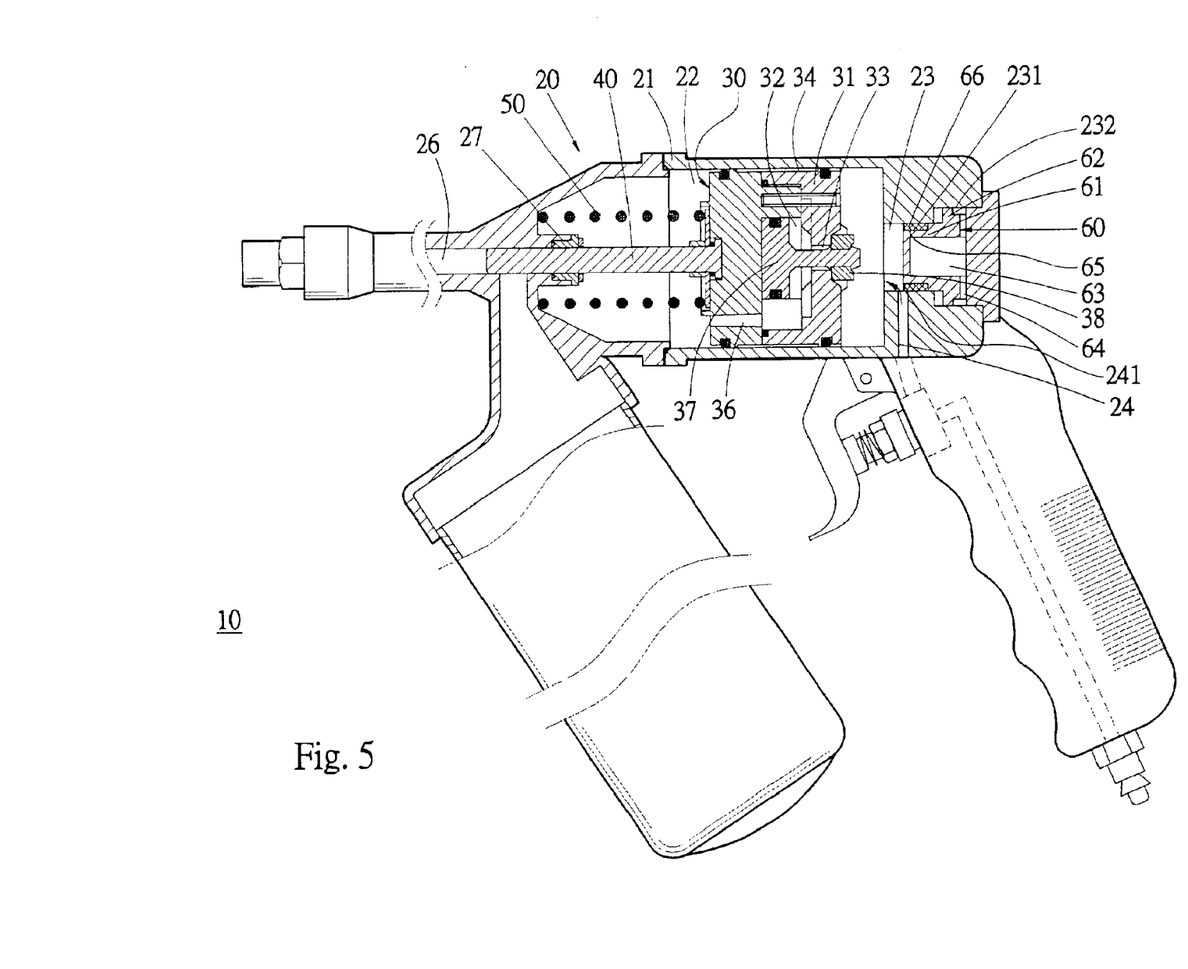
FIG. 5 is a sectional view according to FIG. 3, in which the piston is moved out of the start position.

Then, as shown in FIG. 5, after the high pressure air goes into the inlet passage 24, the controlling valve 60 is positioned in the open position to free the opening 241 so that the airflow will not be obstructed. Therefore, the high pressure air can go from the inlet passage 24 through the cavity 23 into the air chamber 22 to push the piston body 31 and the grease push rod 40 leftward for pushing out the grease.

At the same time, the pressure of the air is also applied to right end of the sealing rod 37 to keep the sealing rod 37 in the sealing position. Accordingly, the grease can be smoothly dispensed.

Figure 6:
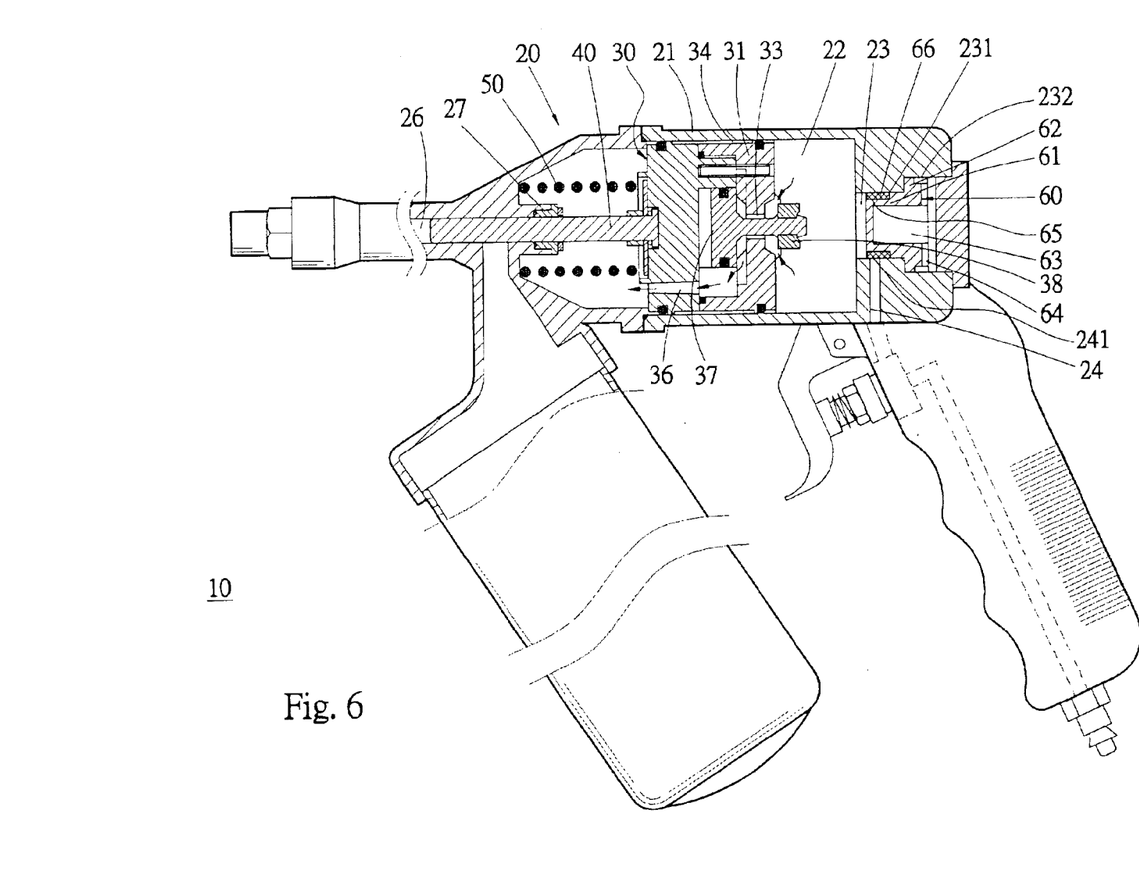
FIG. 6 is a sectional view according to FIG. 3, in which the piston is positioned in the end position.
Figure 7:
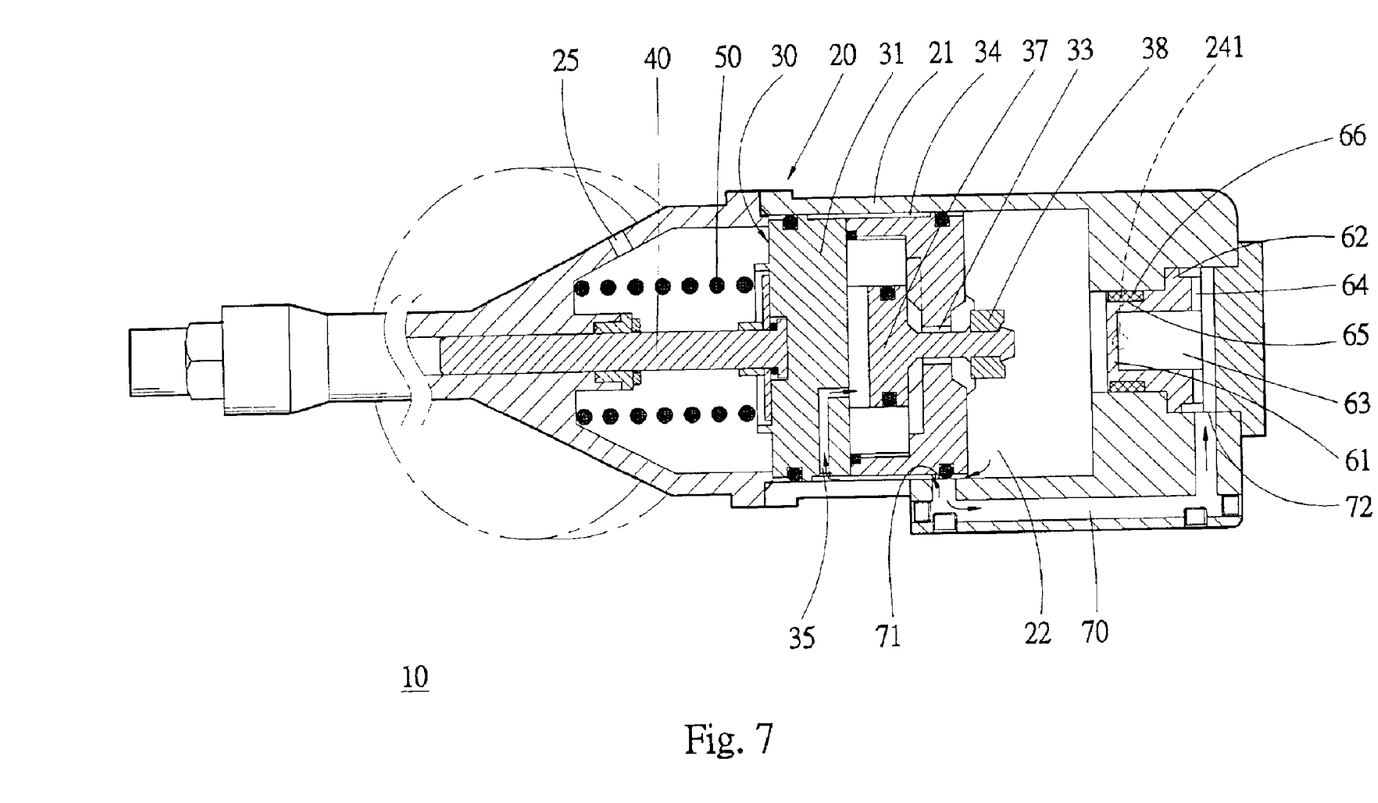
FIG. 7 is a sectional view according to FIG. 4, in which the piston is positioned in the end position.

When the piston body 31 is moved from the start position to the end position, as shown in FIGS. 6 and 7, the piston body 31 is moved to the end position, the airtight washer fitted around the piston body 31 for achieving airtight effect between the piston body 31 and the wall of the air chamber 22. Where the air is moved onto the opening 71 of the shift air passage 70. The opening 71 has a larger size so that a passage is formed to communicate the annular groove 34 and the air chamber 22 containing high pressure air. At this time, the high pressure air in the air chamber 22 through two different paths creates two different effects as follows:

1. The high pressure air goes through the shift air passage into the large inner diameter section 232 of the cavity 23 to axially push the controlling valve 60 from the open position to the closed position. The sealing washer 66 serves to seal the opening 241 of the inlet passage 24 to prevent the external high pressure air from further going in.

2. The high pressure air also synchronously goes through the annular groove 34 into the vent 35. Through the opening of the vent 35 in the internal space 32, by means of the pressure and the instantaneous impact, the sealing rod 37 is moved from the sealing position to the escape position. Accordingly, the internal space 32 via the through hole 33 communicates with the escape tunnels 36. Under such circumstance, the different portions of the air chamber 22, which originally are separated by the piston 30 to respectively contain high pressure air and normal pressure air are communicated with each other. Therefore, the high pressure air in the air chamber 22 can be exhausted from the air chamber 22 through the outlet passage 25.

Figure 1:
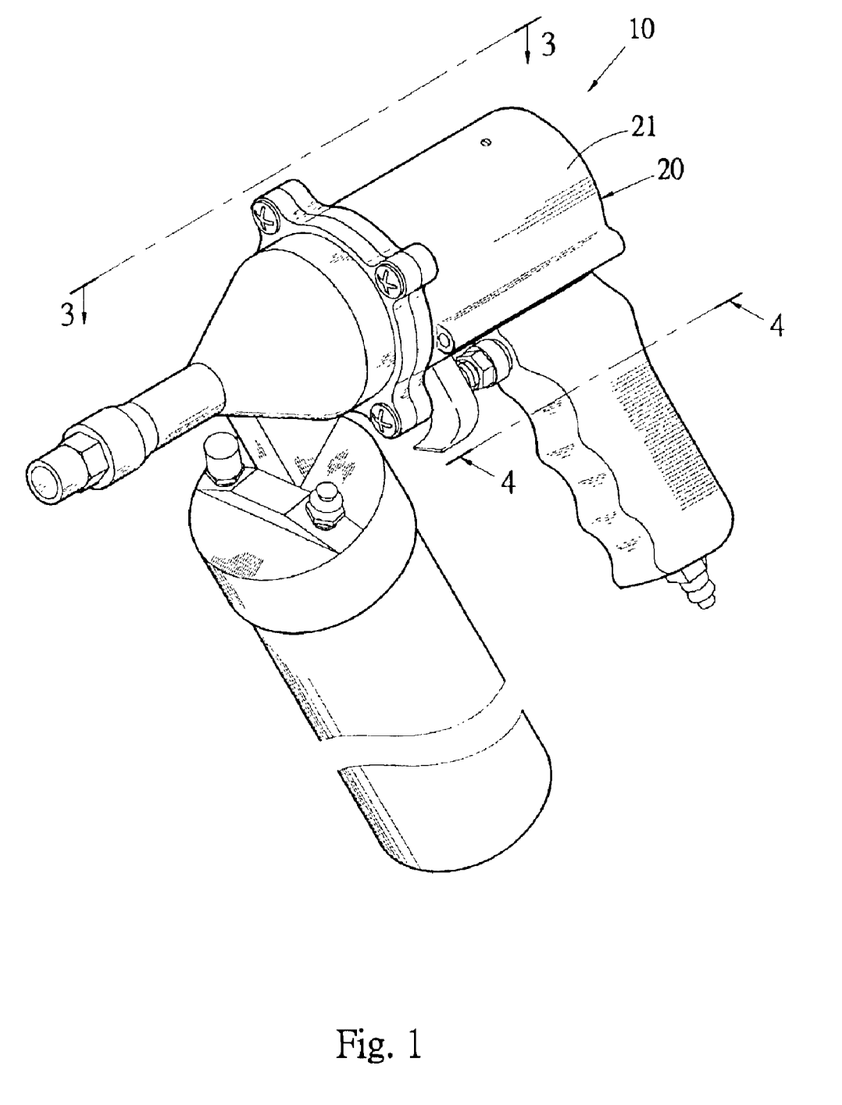
FIG. 1 is a perspective assembled view of a first embodiment of the present invention.
Figure 2:
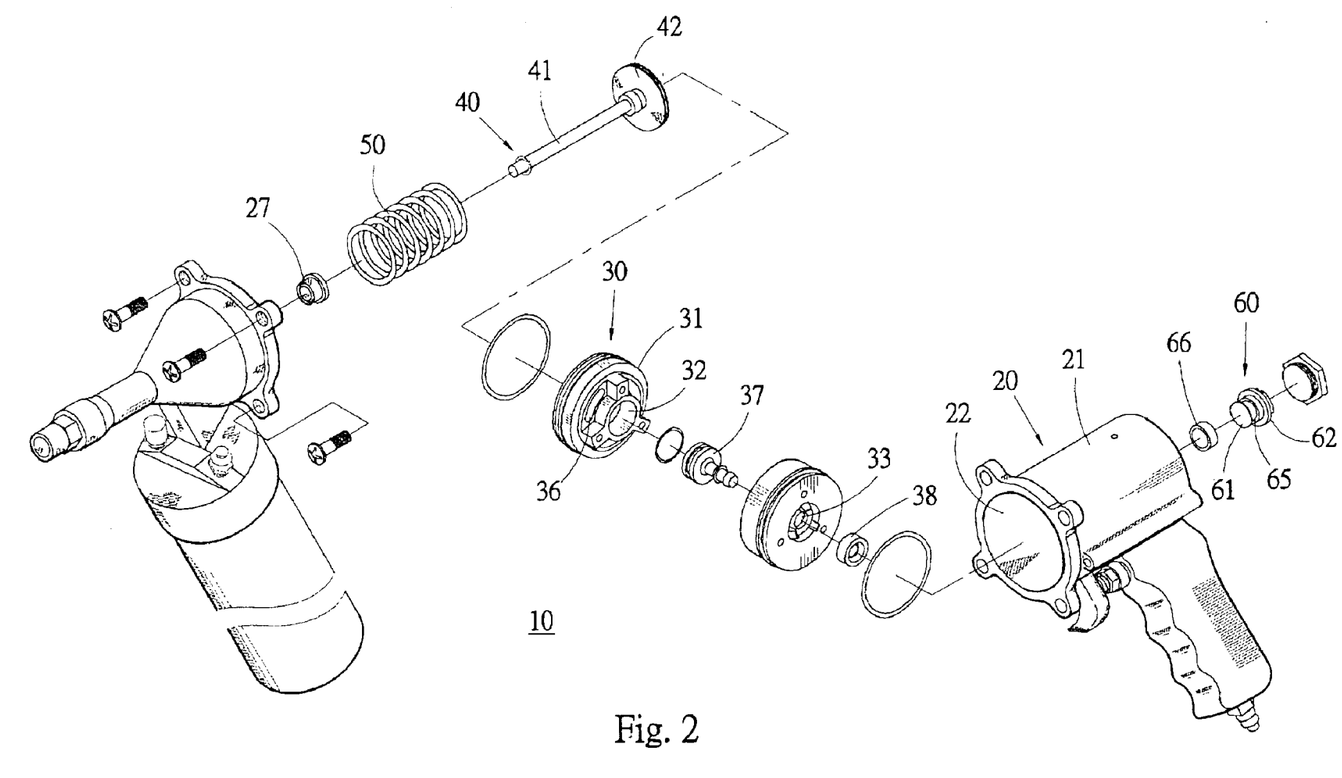
FIG. 2 is a perspective exploded view of the first embodiment of the present invention.

Accordingly, after the air pressure in the air chamber 22 is abruptly reduced, the restoring spring 50 again pushes the piston 30 rightward and the respectively components are restored to the initial state as shown in FIGS. 1 and 2 for next grease pushing operation.

The continuously shooting pneumatic grease gun structure 10 of the present invention has the following advantages:

1. The high pressure air goes into the air chamber 22 to push the piston 30 and the grease push rod 40 so as to push the grease. In addition, when the piston 30 drives the grease push rod 40 to go back from the end position to the start position, the external high pressure air is prevented from going into the air chamber 22. Accordingly, the waste of energy is avoided.

2. In contrast to the conventional technique, in the present invention, the external high pressure air is prevented from always entering the air chamber. The grease dispensing speed of the present invention is synchronous with the rate of change of the external air pressure. In the backward travel of the piston 30, the external air is not utilized to keep the pressure of the external air stable. Therefore, a stable pressure is provided in the grease pushing operation. Accordingly, the pneumatic grease gun is used under stable pressure and thus the grease dispensing speed and amount are both stabilized.

The above embodiment is only used to illustrate the present invention, not intended to limit the scope thereof. Many modifications of the above embodiment can be made without departing from the spirit of the present invention.

What is claimed is:

1. A continuously shooting pneumatic grease gun structure comprising:

an air chamber housing including a body section defining therein an elongated air chamber, an inlet passage formed on the body section for communicating one end of the air chamber with an outer side of the air chamber housing, an outlet passage formed on the body section for communicating another end of the air chamber with the outer side of the air chamber housing, a push hole extending to the outer side of the air chamber housing through a section of the body section corresponding to the other end of the air chamber;

a piston disposed in the air chamber, the piston being reciprocally axially movable within the air chamber between a start position and an end position, whereby when in the end position, the piston permits the air in the air chamber to pass through the piston and escape through the outlet passage to the outer side of the air chamber housing;

a grease gun rod coaxially fitted in the push hole and synchronously movable along with the piston; and a restoring spring compressed between the other end of the air chamber and a face of the piston opposite to the other end, the restoring spring serving to provide resilient force to keep the piston in the start position, said pneumatic grease gun structure being characterized in that the pneumatic grease gun structure further comprising:

a controlling valve disposed on the body section and movable between an open position and a closed position, whereby when in the closed position, the controlling valve blocks the inlet passage to hinder external high pressure air from entering the air chamber, while when in the open position, the controlling valve unblocks the inlet passage, permitting external high pressure air to pass through the inlet passage into the air chamber; and a shift passage formed in the body section to conduct the air from the air chamber to the rear of the controlling valve so as to move the controlling valve from the open position to the closed position, when the piston is positioned in the start position, the controlling valve being positioned in the open position, wherein when the controlling valve is positioned in the closed position, the controlling valve seals a communicating path between the inlet passage and the air chamber, while when the controlling valve is positioned in the open position, the communicating path between the inlet passage and the air chamber is freed.

2. A continuously shooting pneumatic grease gun structure as claimed in claim 1, wherein the controlling valve has a cylindrical body with a predetermined outer diameter, a cylindrical end block being coaxially connected with one end of the cylindrical body, a sealing washer being fitted around the cylindrical body, whereby when the controlling valve is positioned in the closed position, the sealing washer blocks the communicating path between the inlet passage and the air chamber.

3. A continuously shooting pneumatic grease gun structure as claimed in claim 1, wherein the air chamber housing further has a cavity inward extending from a portion of the body section corresponding to one end of the air chamber, the controlling valve being accommodated in the cavity, the inlet passage communicating with the cavity and the portion of the body section, the inlet passage having an opening on a wall of the cavity, whereby when the controlling valve is positioned in the closed position, the sealing washer seals the opening, while when the controlling valve is positioned in the open position, the controlling valve unblocks the opening.

4. A continuously shooting pneumatic grease gun structure as claimed in claim 1, wherein the controlling valve further has a blind hole axially extending from rear end of the end block to the cylindrical body.

5. A continuously shooting pneumatic grease gun structure as claimed in claim 2, wherein the controlling valve further has several notches formed on a free end of the shaft of the end block.

* * * * *